Sept. 20, 1966   F. W. BILLSON   3,273,902
SEALING OF SPINDLES
Filed June 25, 1963

United States Patent Office 3,273,902
Patented Sept. 20, 1966

3,273,902
SEALING OF SPINDLES
Frederick William Billson, Cwmbran, England, assignor to Saunders Valve Company Limited, Monmouthshire, England, a British company
Filed June 25, 1963, Ser. No. 290,432
Claims priority, application Great Britain, July 11, 1962, 26,697/62
7 Claims. (Cl. 277—95)

This invention relates to the sealing of a spindle which has a rotational movement about its axis and especially a rotation through a limited angle as in the case of a plug cock.

Where a limited rotation only has to be provided for, a known device is a sleeve, one end of which is sealed to the spindle and the other end to the casing to which the spindle is to be sealed. The sleeve may be clamped or bound to the spindle and it may be arranged to grip the spindle so firmly that at any rate under normal conditions there is no relative slip. Such seals may involve a considerable twist to be accommodated by the sleeve. A very flexible material such as vulcanised India rubber has to be used if the angle is of the order of say 90°. A twist of this amount is impossible with some materials which may be necessary for the seal on account of the fluid to which they are exposed. The alternative of an O-ring lodged in a groove either in the spindle or in the casing has been found to give a comparatively short life where relatively high temperatures and pressures are involved, even when a material is used for the O-ring which when used in other forms, will withstand such temperatures and pressures.

According to the present invention the seal comprises a diaphragm which is sealed to the casing by its outside margin and which in its free position is dished with a slight reverse curvature at the innermost zone which runs into a rib at the inner margin, which rib engages the spindle with a grip sufficient to minimise leakage at low pressures, but not so great as to prevent the spindle from rotating in relation to the rib, the diaphragm being disposed with its convexity towards the low pressure side, and being supported on this side just outside the rib while a slight space is left between the support and the spindle. In operation the fluid pressure acting on the diaphragm tends to force the rib into the slight space left between the support and the spindle and thus urge it more firmly against the spindle without the diaphragm and rib, as a whole, being in adequately supported.

The invention will be further described with reference to the accompanying drawings which illustrate an example as applied to the spindle of a plug cock.

Figure 1:
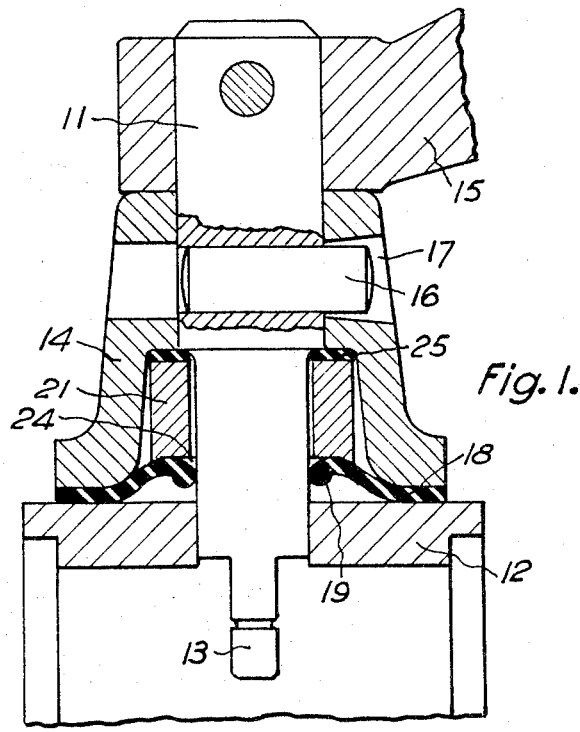
Figure 2:
Figure 3:
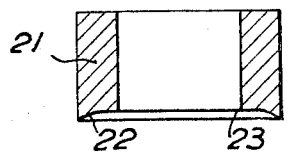

FIG. 1 is an axial section of the spindle and seal.
FIG. 2 is a section of the seal diaphragm in its free condition and,
FIG. 3 is an axial section of the support ring used in FIG. 1.

The drawing illustrates a spindle 11 which extends down into the casing 12 of a plug cock, the lower end of the spindle being cut away at the sides to leave a tongue 13 which engages the plug of the cock. The plug and details of the casing are not shown because they are not relevant to the present invention which is concerned with providing a seal to minimise outward leakage from the cock casing due to the passage of the spindle through it.

As well as being journalled in the cock casing the spindle is journalled in a bonnet 14 held in position by bolts not shown in the drawing. The drawing also indicates a handle 15 pinned to the spindle and another pin 16 working in a slot 17 in the bonnet to limit the angle of rotation of the spindle to say 90° in a manner well-known in itself.

The bonnet serves to clamp and thereby seal to the casing 12 the peripheral zone of a diaphragm 18 constituting the spindle seal according to the invention. The inner margin of the diaphragm terminates in a rib 19 of rounded section which engages the spindle with a grip sufficient to minimize leakage but not so great as to prevent the spindle from rotating in relation to the rib.

The clamping of the peripheral zone of the diaphragm by the bonnet 14 causes slight inward growth of the material of the diaphragm within the clamped zone and to accommodate this without displacing the rib 19 the diaphragm when free is of dished form but the portion carrying the rib has a slight reverse curvature. The diaphragm is disposed with its convexity away from the interior of the casing 12 i.e. towards the low pressure side.

The reverse curved outline runs tangentially into the rib 19 which is suitably of circular section and of a diameter of about twice the thickness of the diaphragm.

A supporting surface is provided for the diaphragm just outside the rib 19 on the low pressure side and located so that when the seal is assembled the dishing of the diaphragm is slightly reduced as comparison of FIGS. 1 and 2 will show.

The supporting surface is conveniently formed on a separate ring 21 and comprises an outer coned portion 22 which approximates closely to the shape of the diaphragm immediately outside the point of reversal of curvature, and a flat inner portion 23 transverse to the spindle. Thus a space 24 is left between the surface 23 and the diaphragm into which the diaphragm and rib can be pressed by the pressure to be sealed which gains access to the inner side of the diaphragm through the clearance between the spindle 11 and casing 12. Accordingly the higher the fluid pressure the more firmly the rib 19 is pressed against the spindle.

In view of this action of the pressure no tight grip on the spindle when there is no pressure is necessary, though there should be some grip. For example where the spindle 11 is of 7/16 inch (11 mm.) diameter a seal having a bore in the free state 0.025 to 0.035 inch (0.63 mm. to 0.89 mm.) smaller than the spindle will be satisfactory.

The action of the pressure in forcing the rib 19 closer to the spindle 11 not only serves to provide a good seal but also to compensate a certain amount for wear in the rib thus giving the seal a long life.

The material for the diaphragm and rib will be selected according to the temperature, pressure and nature of the fluid although it must be of a flexible character. By way of example the inert rubber-like linear copolymer of vinylidene fluoride and hexafluoropropylene sold under the trade name VITON can be used and a seal made of this material can withstand line pressures up to 250 lbs. per square inch (17.6 kg. per square cm.) and temperatures of at least 150° C.

Other possible materials are natural and synthetic rubbers or rubber-like materials including silicone rubbers. No reinforcement in the seal is necessary.

The other end of the ring 21 in the illustrated example grips in position a sealing washer 25 which also engages the spindle 11 thus providing an auxiliary barrier which limits the leakage in the event of failure of the seal. This washer may be of the same material as the diaphragm 18.

I claim:
1. A seal for sealing against fluid pressure a spindle to a casing in relation to which it makes a rotational movement about its axis, comprising a centrally apertured elastic and flexible diaphragm incorporating a rib around the edge of its central aperture, the diaphragm in its free condition being substantially dished with a slight reverse curvature in the zone which runs into the rib, the diameter of the aperture being slightly less than that of the spindle whereby the rib engages the spindle with a grip sufficient to minimize leakage at low pressure but not so great as to prevent the spindle from rotating in relation to the rib, means sealing the outer margin of the diaphragm to the casing, the diaphragm being mounted with the convexity due to its dished form towards the low pressure side of the seal, and supporting means in the casing having a supporting surface and supporting the diaphragm on the low pressure side, the supporting surface having substantial clearance around the spindle and being shaped to leave a small space around the spindle between the supporting surface and the diaphragm into which pressure acting on the high pressure side of the seal tends to force the rib against the spindle, and said rib projecting toward the high pressure side of the seal.

2. A seal according to claim 1 in which the reverse curved outline of the diaphragm runs tangentially into the rib which is of rounded section and of a diameter of about twice the thickness of the diaphragm.

3. A seal according to claim 1 in which the supporting surface is located so that when the seal is assembled the dishing of the diaphragm is slightly reduced as compared with its free position.

4. A seal according to claim 1 in which the supporting surface comprises an outer coned portion which approximates closely to the shape of the diaphragm immediately outside the point of reversal of curvature, and a flat inner portion transverse to the spindle.

5. A seal according to claim 1 in which the supporting surface is formed on one end of a separate ring carried in a bonnet in which the spindle is journalled and which also serves to clamp and thereby seal the peripheral zone of the diaphragm to the casing.

6. A seal according to claim 5 in which the other end of the ring grips in a position a sealing washer which engages the spindle and thus provides an auxiliary barrier against leakage.

7. A seal according to claim 1 in which the diaphragm is composed of an inert rubber-like linear copolymer of vinylidence fluoride and hexafluoropropylene.

References Cited by the Examiner
UNITED STATES PATENTS

| | | | |
|---|---|---|---|
| 1,349,060 | 8/1920 | Gall et al. | 277—81 X |
| 1,956,844 | 5/1934 | Wheeler | 277—81 X |
| 2,572,952 | 10/1951 | Rymal | 74—18.1 X |
| 2,949,787 | 8/1960 | Klingler | 74—18.2 |

FOREIGN PATENTS

| | | |
|---|---|---|
| 235,326 | 3/1960 | Australia. |
| 636,374 | 2/1962 | Canada. |
| 492,954 | 9/1938 | Great Britain. |

LAVERNE D. GEIGER, *Primary Examiner.*

J. MEDNICK, *Assistant Examiner.*